United States Patent
Klatt

(10) Patent No.: US 12,418,862 B2
(45) Date of Patent: Sep. 16, 2025

(54) METHOD FOR TAKING INTO ACCOUNT ENERGY INTENSITY OF DATA TRANSMISSIONS BETWEEN A USER EQUIPMENT AND A TELECOMMUNICATIONS NETWORK, USER EQUIPMENT, TELECOMMUNICATIONS NETWORK, PROGRAM, AND COMPUTER-READABLE MEDIUM

(71) Applicant: Deutsche Telekom AG, Bonn (DE)

(72) Inventor: Axel Klatt, Cologne (DE)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 18/558,744

(22) PCT Filed: May 2, 2022

(86) PCT No.: PCT/EP2022/061710
§ 371 (c)(1),
(2) Date: Nov. 3, 2023

(87) PCT Pub. No.: WO2022/233785
PCT Pub. Date: Nov. 10, 2022

(65) Prior Publication Data
US 2024/0267850 A1 Aug. 8, 2024

(30) Foreign Application Priority Data
May 7, 2021 (EP) .................................... 21172640

(51) Int. Cl.
*H04W 52/02* (2009.01)
*H04W 52/24* (2009.01)
*H04W 52/28* (2009.01)

(52) U.S. Cl.
CPC ... *H04W 52/0251* (2013.01); *H04W 52/0219* (2013.01); *H04W 52/0254* (2013.01); *H04W 52/245* (2013.01); *H04W 52/281* (2013.01)

(58) Field of Classification Search
CPC ......... H04W 52/0261; H04W 52/0212; H04W 28/0221; H04W 52/0219; H04W 52/241;
(Continued)

(56) References Cited

U.S. PATENT DOCUMENTS

| | | |
|---|---|---|
| 6,748,246 B1 | 6/2004 | Khullar |
| 2008/0153532 A1 | 6/2008 | Camp |

(Continued)

FOREIGN PATENT DOCUMENTS

| | | |
|---|---|---|
| CN | 1449636 A | 10/2003 |
| CN | 109478991 A | 3/2019 |

(Continued)

*Primary Examiner* — Omer S Mian
(74) *Attorney, Agent, or Firm* — LEYDIG, VOIT & MAYER, LTD.

(57) ABSTRACT

A method for factoring energy intensity of data transmissions between a user equipment (UE) and a network, in order to take into account the energy intensity of data transmissions between the UE and the network, includes the UE receiving an energy intensity indication, the energy intensity indication being related to at least one radio access technology for communicating data. A radio access technology is selected by the UE based on energy intensity indication and energy priority information, where the energy intensity indication refers to the energy intensity of data transmissions between the UE and the network in terms of energy per data volume transmitted, energy per bandwidth used, or energy per latency realized.

9 Claims, 2 Drawing Sheets

100 telecommunications network
120 core network
110 access network
111 WiFi access point
112, 113, 114 base station entity
20 user equipment
21 uplink data
22 downlink data
150 energy priority information

(58) Field of Classification Search
CPC ........... H04W 52/243; H04W 52/0251; H04W 52/0258; H04W 52/0254; H04W 88/06; H04W 48/18; H04W 52/281; H04W 52/143; H04W 52/146; H04W 52/245; Y02D 30/70

See application file for complete search history.

(56) References Cited

U.S. PATENT DOCUMENTS

| | | |
|---|---|---|
| 2012/0297223 A1* | 11/2012 | Wu .................. H04W 52/0212 713/320 |
| 2014/0301199 A1* | 10/2014 | Wang ..................... H04L 69/18 370/235 |
| 2014/0376400 A1 | 12/2014 | Kanamarlapudi et al. |
| 2018/0049220 A1 | 2/2018 | Patil et al. |
| 2018/0242256 A1 | 8/2018 | Nenner et al. |
| 2018/0343616 A1* | 11/2018 | Karsi ................ H04W 52/0235 |
| 2018/0343618 A1 | 11/2018 | Park et al. |
| 2019/0380093 A1* | 12/2019 | Ang .................. H04W 52/0261 |
| 2020/0037246 A1* | 1/2020 | Hwang ............. H04W 52/0216 |
| 2023/0209463 A1* | 6/2023 | Shih ................. H04W 52/0216 370/311 |

FOREIGN PATENT DOCUMENTS

| | | |
|---|---|---|
| EP | 2874446 A1 | 5/2015 |
| JP | 2016525300 A | 8/2016 |
| JP | 2019029926 A | 2/2019 |
| WO | WO 02/03733 A1 | 1/2002 |
| WO | WO 2020076965 A1 | 4/2020 |

* cited by examiner 100 telecommunications network
120 core network
110 access network
111 WiFi access point
112, 113, 114 base station entity
20 user equipment
21 uplink data
22 downlink data
150 energy priority information

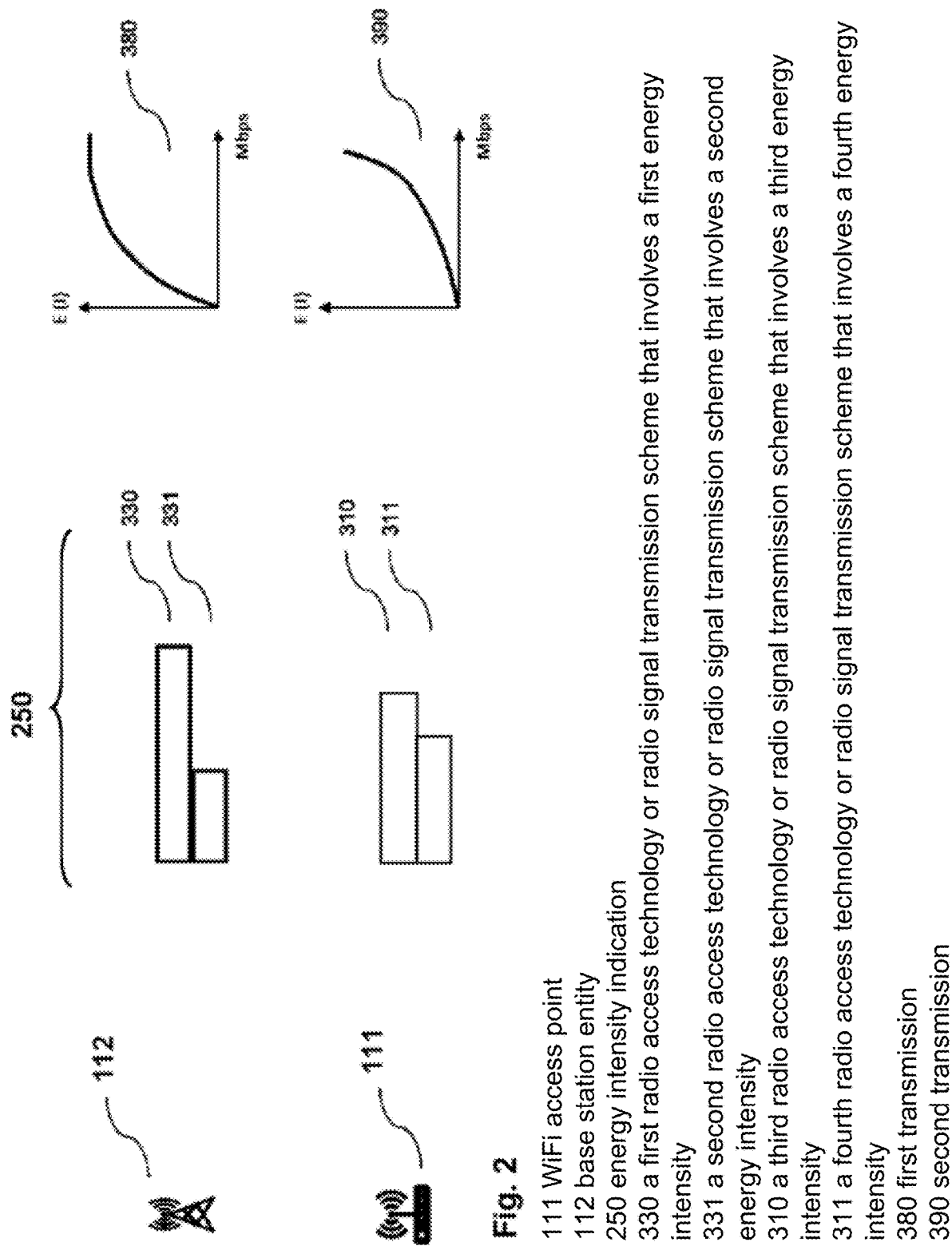

METHOD FOR TAKING INTO ACCOUNT ENERGY INTENSITY OF DATA TRANSMISSIONS BETWEEN A USER EQUIPMENT AND A TELECOMMUNICATIONS NETWORK, USER EQUIPMENT, TELECOMMUNICATIONS NETWORK, PROGRAM, AND COMPUTER-READABLE MEDIUM

CROSS REFERENCE TO RELATED APPLICATIONS

This application is a U.S. National Phase application under 35 U.S.C. § 371 of International Application No. PCT/EP2022/061710, filed on May 2, 2022, and claims benefit to European Patent Application No. EP 21172640.1, filed on May 7, 2021. The International Application was published in English on Nov. 10, 2022 as WO 2022/233785 under PCT Article 21(2).

FIELD

The present invention relates inter alia to a method for taking into account energy intensity of data transmissions between a user equipment and a telecommunications network.

Furthermore, the present invention relates to a user equipment configured for taking into account energy intensity of data transmissions between a user equipment and a telecommunications network.

Additionally, the present invention relates to a telecommunications network for taking into account energy intensity of data transmissions between a user equipment and the telecommunications network.

Furthermore, the present invention relates to a program comprising a computer readable program code, and to a computer-readable medium for using an inventive user equipment or an inventive telecommunications network.

BACKGROUND

The energy consumption in cellular networks, especially in new systems like 5G is comparatively high. Due to the Shannon-Hartley-Theorem, a certain minimum amount of energy per transmitted bit is and will always be necessary for realizing any (reliable) data transmission over a wireless transmission channel. Hence, as part of the global responsibility of companies and industries to meet CO2 reduction targets, a new approach is needed.

SUMMARY

In an embodiment, the present disclosure provides a method for taking into account energy intensity of data transmissions between a user equipment and a telecommunications network, the telecommunications network comprising an access network, wherein the user equipment is, at least temporarily, in communication exchange with the telecommunications network using radio resources of an air interface between the user equipment and the access network such that a plurality of radio access technologies and/or a plurality of radio signal transmission schemes are able to be used for transmitting uplink data—from the user equipment towards the access network—and/or downlink data—from the access network towards the user equipment—, the plurality of radio access technologies and/or the plurality of radio signal transmission schemes being associated with or related to a first, lower level of energy intensity or at least a second, higher level of energy intensity, wherein the user equipment comprises an energy priority information, wherein, in order to take into account the energy intensity of such data transmissions between the user equipment and the telecommunications network, the method comprises the following steps: in a first step, the user equipment receives, from the telecommunications network or from a dedicated network node thereof, at least one energy intensity indication, the at least one energy intensity indication being related to at least one radio access technology and/or at least one radio signal transmission scheme for transmitting uplink data and/or for receiving downlink data, in a second step, subsequent to the first step, at least one radio access technology and/or at least one radio signal transmission scheme is selected by the user equipment in dependency of the energy intensity indication and the energy priority information, wherein the at least one energy intensity indication refers to the energy intensity of data transmissions between the user equipment and the telecommunications network in terms of one or a plurality of the following measures of energy intensity: the energy used per data volume transmitted, such as a value of Joules required per Mbyte transmitted, the energy used per bandwidth used, such as a value of Joules required per bandwidth, in Mbit per seconds, applied, the energy used per latency realized, such as a value of Joules required per archiving a latency expressed in milliseconds.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIG. 2 schematically illustrates exemplary diagrams of the different energy efficiency of different radio access technologies and/or one of the radio signal transmission schemes that are possible to be used by a user equipment connected to the telecommunications network.

DETAILED DESCRIPTION

Figure 1:
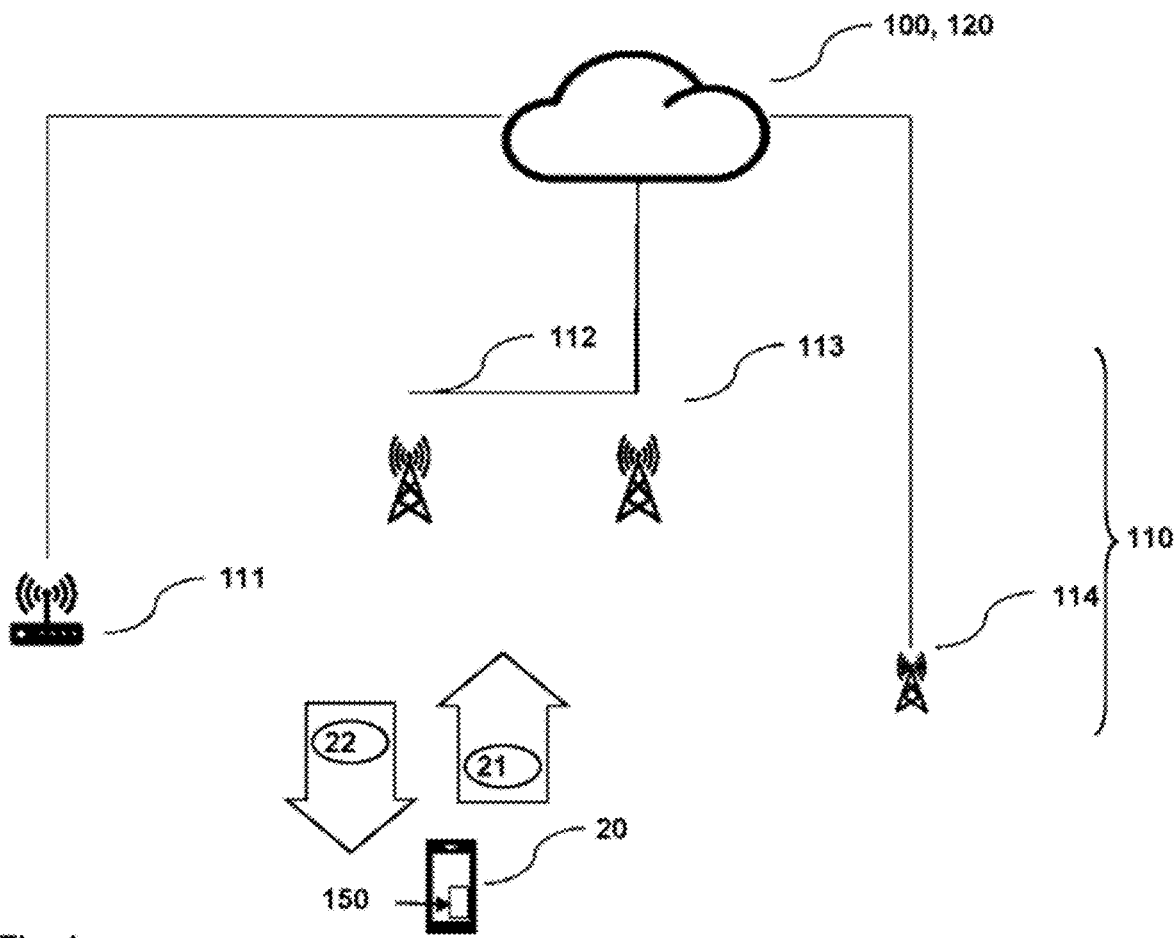
FIG. 1 schematically illustrates a telecommunications network comprising, exemplarily, a fixed-line part as well as a multitude of radio cells being served by a multitude of base station entities, and a user equipment being served by the telecommunications network.

The present invention provides a method for taking into account the energy intensity of data transmissions between a user equipment and a telecommunications network on a comparatively fine-granular level, wherein by means of using and exchanging, by both the telecommunications network and the user equipment, an energy intensity indication, data transmission between the user equipment and the telecommunications network is able to be realized requiring less amounts of energy, resulting in a reduced overall consumption of energy involved in realizing wireless data transmission.

In some embodiments, the present invention provides a method for taking into account energy intensity of data transmissions between a user equipment and a telecommunications network, the telecommunications network comprising an access network,
  wherein the user equipment is, at least temporarily, in communication exchange with the telecommunications network using radio resources of an air interface between the user equipment and the access network such that a plurality of radio access technologies and/or a plurality of radio signal transmission schemes are able to be used for transmitting uplink data—from the user equipment towards the access network—and/or downlink data—from the access network towards the user equipment—, the plurality of radio access technologies and/or the plurality of radio signal transmission schemes being associated with or related to a first, lower level of energy intensity or at least a second, higher level of energy intensity, wherein the user equipment comprises an energy priority information,
  wherein, in order to take into account the energy intensity of such data transmissions between the user equipment and the telecommunications network, the method comprises the following steps:
    in a first step, the user equipment receives, from the telecommunications network or from a dedicated network node thereof, at least one energy intensity indication, the at least one energy intensity indication being related to at least one radio access technology and/or at least one radio signal transmission scheme for transmitting uplink data and/or for receiving downlink data,
    in a second step, subsequent to the first step, at least one radio access technology and/or at least one radio signal transmission scheme is selected by the user equipment in dependency of the energy intensity indication and the energy priority information.

According to the present invention, it is thereby advantageously possible to specifically adjust—with fine granularity and depending on the energy intensity indication received by the user equipment from the telecommunications network as well as depending on the corresponding selection or indication, by the user equipment, of at least one radio access technology and/or at least one radio signal transmission scheme—the energy consumption or energy intensity of the specifically considered wireless data transmission between the considered user equipment on the one hand, and the corresponding network node (typically a base station entity) of the telecommunications network.

In modern mobile communication systems, especially cellular communication systems, there are multiple ways to provide for a transmission of data, starting from the usage of very different radio technologies of the different generations of radio access technologies (like GSM/UMTS/LTE/NB-IoT/LTE-M/5G) within public land mobile networks, but also the different variants of WiFi technology, also called wireless local area network, WLAN. This flexibility of having multiple accesses to allow a data transfer (or the plurality of radio access technologies or the plurality of radio signal transmission schemes) lead to a choice or a selection of the radio access technology and/or to a mainly binary decision between using either WiFi technology and/or cellular technology, especially in case that, as it is often the case in typical homes, both cellular access as well as WiFi access is available.

In conventionally known telecommunications networks, while the high-level topic of the importance of energy consumption is known as such, the implemented wireless, especially cellular, standards overwhelmingly used today, like LTE or 5G, do not provide a specific solution or implementation that specifically also takes into account—besides other considerations—the amount of energy (or the energy intensity of the considered data transmission) used to transmit a specifically considered amount of data, or a specifically considered connection or data flow on a fine-granular level.

Any data transmission over a wireless channel may require a minimum amount of energy per bit transmitted, this principle having been outlined, already many decades ago, by Claude Shannon and Ralph Hartley in the famous and still valid Shannon-Hartley-Theorem, stating that $Eb/N0 > \ln 2$, i.e. the transmission of a certain number of bits may require a minimum amount of energy (Eb), and, in turn, the faster the transmission of data over a non-ideal channel is, the more energy may be required (or the higher the amount of transferred data, the higher the energy consumption).

Regarding the above mentioned radio technology selection (i.e. choosing the radio access technology and/or deciding between using either WiFi technology and/or cellular technology), there is conventionally typically no need to consider minimizing the energy that may be required (or the energy intensity) for such a transmission, as, conventionally, this selection is mainly driven by subscription cost, service requirements of simply signal quality levels. Hence, regarding a specific amount of data, or a specific connection or data flow, there is conventionally no consideration of an energy budget used, or an energy priority, neither on the device (user equipment) side nor on the network side.

According to the present invention, the device side (i.e. the user equipment) is involved in defining or in determining the energy-intensity to be applied to a specific amount of data, or a specific connection or data flow, i.e. the user equipment is a control point for minimization of its own, but also the network's power consumption. Hence, according to the present invention, the energy intensity of data transmissions between the user equipment and (a network node, typically a base station entity, of) the telecommunications network is taken (or able to be taken) into consideration. Typically, the user equipment is, at least temporarily, in communication exchange with the telecommunications network, using radio resources of an air interface between the user equipment and the access network such that a plurality of radio access technologies and/or a plurality of radio signal transmission schemes are able to be used for transmitting uplink data—from the user equipment towards the access network—and/or downlink data—from the access network towards the user equipment. In some embodiments, the telecommunications network also comprises (or is assigned or related to), besides the access network, a core network.

The plurality of radio access technologies and/or the plurality of radio signal transmission schemes are associated with or related to a first, lower level of energy intensity, or at least a second, higher level of energy intensity, and the user equipment comprises an energy priority information, typically a preference for either a lower level or a higher level of energy intensity.

In order for the energy intensity of such data transmissions between the user equipment and the telecommunications network to be taken into consideration (or to be able to be taken into consideration) on a comparatively fine grained level, it is proposed, according to the present invention, that, in a first step, the user equipment receives, from the telecommunications network or from a dedicated network node thereof, at least one energy intensity indication, the at least one energy intensity indication being related to at least one radio access technology and/or at least one radio signal transmission scheme for transmitting uplink data and/or for receiving downlink data. In a second step, subsequent to the first step, at least one radio access technology and/or at least one radio signal transmission scheme is selected by the user equipment in dependency of the energy intensity indication and the energy priority information (of the user equipment).

Hence, according to the present invention, the at least one energy intensity indication (relating to or being related to at least one, but typically more than one, radio access technology/technologies and/or radio signal transmission scheme(s) for transmitting uplink data and/or for receiving downlink data) is received by the user equipment, and one of these radio access technologies or transmission schemes is selected as a function of the energy priority information (and of what the energy intensity indication indicates).

Hence, as there are multiple ways to transfer a data packet (in upstream or downstream direction between the user equipment and the telecommunications network) with often very different energy consumption (or energy intensity) on different radio technologies, the present invention proposes to utilize information about an "energy Budget" or an "energy Priority" (as contained in the energy priority information and the energy intensity indication) for the routing of that data packet. Thus, the present invention is especially related to the configuration of the user equipment (or communication device used) and the related signaling (between the telecommunications network and the user equipment by means of the energy intensity indication) for especially setting different "energy consumption" and/or "sustainability" profiles.

One specific decision to be taken according to the present invention relates to the decision of using either WiFi or a cellular radio access technology (e.g. WiFi vs LTE), but the present invention is not at all limited to deciding only between these two access technologies; actually, even far more than two radio access technologies (or signalization schemes) could be utilized in the context of the present invention, i.e. considered in the decision which radio access technology and/or which radio signal transmission scheme shall be used—as a function of the energy priority information, being informed by the energy intensity indication—in a specifically considered communication of a user equipment with the respective base station entity of the telecommunications network.

Especially, the decision or selection (which radio access technology and/or which radio signal transmission scheme shall be used) either occurs as part of the initial access selection or during the lifetime of a or multiple connections through various different radio technologies.

According to the present invention, it is assumed that the telecommunications network and the user equipment support the selection of a multiplicity of radio access technologies and/or transmission schemes. Possible radio access technologies in this sense are technologies using licensed or unlicensed spectrum, using techniques such GPRS/EDGE, UMTS/HSPA, LTE/LTE-A, WIFI etc. with features like higher-order modulation, power control, MIMO, beam forming, carrier aggregation, etc.

According to an embodiment of the present invention, the energy priority information is related to or reflects a preference of either a lower level of energy intensity or a higher level of energy intensity stored in the user equipment, and especially provided by the user of the user equipment.

Thereby, it is advantageously possible that the decision or the choice to be made (i.e. which radio access technology and/or which radio signal transmission scheme to be used in a specific situation) is based on whether the priority (at the user equipment level), i.e. the energy priority information, reflects a preference of either a lower or higher level of energy intensity. Of course, according to variants or embodiments of the present invention, a higher granularity of such a priority is possible, e.g., in the form of having three different levels of energy priority information, such as "low", "middle", "high", and/or that the energy priority information is expressed in terms of quality of service requirements either stored in the user equipment, or provided (e.g. ad hoc, or previously stored) by the customer or user of the user equipment. The energy priority information does not need to be defined by the customer or user of the user equipment but could also be defined by settings of the network operator, e.g. as a function of the type of contract regarding the specific user equipment.

According to a further embodiment of the present invention, the at least one energy intensity indication is received, by the user equipment, via one or a plurality out of the following:
  a broadcast control channel or a common broadcast control channel, especially the broadcast control channel according to the LTE, long term evolution, radio access technology or the NR, new radio, radio access technology, or any of the WiFi broadcast channels, or any other broadcast channel of the related radio access technology,
  a dedicated control channel for the user equipment or a group of user equipments,
  as part of a registration procedure of the user equipment with the telecommunications network or as part of a service setup procedure of the user equipment with the telecommunications network,
  as part of a pre-configuration using a secure subscriber element such as a Universal Integrated Circuit Card, UICC.

Thereby, it is advantageously possible that the energy intensity indication is able to transmitted to the user equipment using a multitude of different routes or manners.

Furthermore, according to an embodiment of the present invention the user equipment is a mobile user equipment and the user equipment is able to receive, from the telecommunications network,
  mobile access as from a mobile communication network and/or
  fixed-line access as from a fixed-line telecommunications network, using wireless local area network, WLAN, functionality.

It is thereby advantageously possible to apply the concept of the present invention in a multitude of different situations and scenarios.

According to still a further embodiment of the present invention, the at least one energy intensity indication comprises at least a first piece of energy intensity indication and a second piece of energy intensity indication, wherein the first piece of energy intensity indication is associated with or related to a first radio access technology and/or a first radio signal transmission scheme, and wherein the second piece of energy intensity indication is associated with or related to a second radio access technology and/or a second radio signal transmission scheme,
  wherein especially at least two pieces of energy intensity indication refer to one single radio access technology, depending on different modes of operation and/or different radio signal transmission schemes used on the basis of that radio access technology.

Thereby, it is advantageously possible according to the present invention that the content of the energy intensity indication (or the content of a plurality of pieces of energy intensity indication) is able to convey a fine-grained indication as to which radio access technology and/or which radio signal transmission scheme within a radio access technology is rather associated with a lower energy intensity or rather with a higher energy intensity.

According to another embodiment of the present invention, the at least one energy intensity indication refers to the energy intensity of data transmissions between the user equipment and the telecommunications network in terms of one or a plurality of the following measures of energy intensity:
- the energy used per data volume transmitted, such as a value of Joules required per Mbyte transmitted,
- the energy used per bandwidth used, such as a value of Joules required per bandwidth, especially in Mbit per seconds, applied,
- the energy used per latency realized, such as a value of Joules required per archiving a latency expressed in milliseconds,
- wherein especially a first energy intensity indication refers to a first of such measures of energy intensity and a second energy intensity indication refers to a second of such measures of energy intensity,
- wherein at least one of the at least one energy intensity indication and/or at least one of the pieces of energy intensity indication refers to or indicates one of at least three defined different levels of energy intensity, especially of at least four different levels of energy intensity.

Thereby, it is advantageously possible according to the present invention that the energy intensity indication refers to different measures or to a multitude of measures and/or that the energy intensity indication indicates more than only two different values (such as "high(er)" or "low(er)").

According to a further embodiment of the present invention, the energy priority information defines, for at least one situation of both the user equipment and, at least local, network conditions of the access network and/or the telecommunications network whether a rather lower level of energy intensity or a rather higher level of energy intensity is preferred by the user equipment or its user,
- wherein especially the energy priority information is transmitted, by the user equipment, to the telecommunications network or to a dedicated network node thereof.

Thereby, it is advantageously possible according to the present invention that a flexible handling regarding minimizing the energy intensity is possible. Normally, the level of quality-of-service will typically be linked with the energy intensity, i.e. a rather higher energy intensity applied corresponds with a rather higher possible quality-of-service level, and, vice versa, a rather lower energy intensity applied corresponds with a rather lower possible quality-of-service level. A user or customer, using the user equipment, might normally be inclined (especially regarding a part of the telecommunication services requested) to rather prefer a lower energy intensity (and accept a lower quality-of-service level), however, even regarding such a user or customer there might be situations where quality-of-service is prioritized over energy intensity.

The manner how the telecommunications network (or the base station entity taking care a specific user equipment) is actually informed (by the user equipment) about the choice or the selection of the user equipment (as a function of the energy priority information, informed by the energy intensity indication received by the telecommunications network) might also be different according to different embodiments of the present invention, or even according to different situations or scenarios: One possibility is to simply transmit (by the user equipment) the energy priority information to the telecommunications network (or the base station entity or to another dedicated network node); another possibility is (for the user equipment) to choose one of the radio access technologies and/or one of the radio signal transmission schemes indicated or referred to by the energy intensity indication. This latter approach provides the possibility that the actual value (or content) of the energy priority information is rather hidden to the telecommunications network, and only the result of the decision is communicated or shared with the telecommunications network or the dedicated network node thereof.

However the information about which radio access technology and/or which radio signal transmission scheme (or which energy priority information) to use is transmitted to the telecommunications network (or the respective network node), the telecommunications network will control or configure the respective components and functionalities (especially the scheduler) such that the user preference is executed or at least as truly as possible.

Furthermore, according to the present invention, the energy priority information corresponds to a user preference of the user equipment's user and/or to a subscription-related setting reflecting a pre-defined energy intensity setting that is especially able to be different at different points in time according to one or a plurality of the following scenarios:
- the energy priority information is generally set to a comparatively low energy intensity, especially as part of a green mode subscription related to the user equipment,
- the energy priority information is set to preferring a comparatively low energy intensity for normal situations but is able to be set to a boost mode setting corresponding to preferring a higher energy intensity at specific points in time and on specific demand from the user equipment's user.

Thereby, it is advantageously possible according to the present invention that the overall energy intensity is able to be lowered regarding the user equipment, and this in full agreement with the user equipment user's preferences and decisions, i.e. to have or to experience a lower quality-of-service (related to or coming with using a lower energy intensity) corresponds to the user's decision and is not imposed upon by the telecommunications network or its operator.

The present invention also relates to a user equipment configured for taking into account energy intensity of data transmissions between a user equipment and a telecommunications network, wherein the user equipment is, at least temporarily, in communication exchange with the telecommunications network using radio resources of an air interface between the user equipment and an access network of the telecommunications network such that a plurality of radio access technologies and/or a plurality of radio signal transmission schemes are able to be used for transmitting uplink data—from the user equipment towards the access network—and/or downlink data—from the access network towards the user equipment—, the plurality of radio access technologies and/or the plurality of radio signal transmission schemes being associated with or related to a first, lower level of energy intensity or at least a second, higher level of energy intensity, wherein the user equipment comprises an energy priority information, wherein, in order to take into account the energy intensity of such data transmissions between the user equipment and the telecommunications network, the user equipment is configured such that:
  the user equipment receives, from the telecommunications network or from a dedicated network node thereof, at least one energy intensity indication, the at least one energy intensity indication being related to at least one radio access technology and/or at least one radio signal transmission scheme for transmitting uplink data and/or for receiving downlink data,
  at least one radio access technology and/or at least one radio signal transmission scheme is selected by the user equipment in dependency of the energy intensity indication and the energy priority information.

Thereby it is advantageously possible, that— also with respect to the user equipment—the energy intensity is able to be modulated or modified, especially based on a decision or preference of the user equipment's user, for a specific user equipment.

The present invention also relates to a telecommunications network for taking into account energy intensity of data transmissions between a user equipment and the telecommunications network, the telecommunications network comprising a core network and an access network, the user equipment being, at least temporarily, in communication exchange with the telecommunications network, using radio resources of an air interface between the user equipment and the access network such that a plurality of radio access technologies and/or a plurality of radio signal transmission schemes are able to be used for transmitting uplink data—from the user equipment towards the access network—and/or downlink data—from the access network towards the user equipment—, the plurality of radio access technologies and/or the plurality of radio signal transmission schemes being associated with or related to a first, lower level of energy intensity or at least a second, higher level of energy intensity,
  wherein, in order to take into account the energy intensity of such data transmissions between the user equipment and the telecommunications network, the telecommunications network is configured such that:
    the telecommunications network or a dedicated network node thereof transmits, to the user equipment, at least one energy intensity indication, the at least one energy intensity indication being related to at least one radio access technology and/or at least one radio signal transmission scheme for receiving uplink data and/or for transmitting downlink data,
    at least one radio access technology and/or at least one radio signal transmission scheme being selected by the user equipment in dependency of the energy intensity indication and the energy priority information.

Thereby it is advantageously possible, that—also with respect to the telecommunications network—the energy intensity is able to be modulated or modified, especially based on a decision or preference of the user equipment's user, for a specific user equipment.

Furthermore, the present invention relates to a program comprising a computer readable program code which, when executed on a computer or on a network node of a telecommunications network or on a user equipment, or in part on the network node of the telecommunications network and/or in part on the user equipment, causes the computer or the network node of the telecommunications network or the user equipment to perform the inventive method.

The present invention also relates to a computer-readable medium comprising instructions which when executed on a computer or on a network node of a telecommunications network or on a user equipment, or in part on the network node of the telecommunications network and/or in part on the user equipment, causes the computer or the network node of the telecommunications network or the user equipment to perform the inventive method.

These and other characteristics, features and advantages of the present invention will become apparent from the following detailed description, taken in conjunction with the accompanying drawings, which illustrate, by way of example, the principles of the invention. The description is given for the sake of example only, without limiting the scope of the invention. The reference figures quoted below refer to the attached drawings.

DETAILED DESCRIPTION

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

In FIG. 1, a telecommunications network 100 is schematically shown. In the example shown, the telecommunications network 100 is represented comprising a fixed-line part (comprising a fixed-line connected WiFi access point 111) as well as a multitude of radio cells being served by a multitude of base station entities 112, 113, 114. Furthermore, a user equipment 20 is schematically shown being served by the telecommunications network 100. Typically but not necessarily, the telecommunications network 100 comprises, besides the access network 110, also a core network 120. The telecommunications network 100 is a cellular telecommunications network, comprising typically a plurality of network cells (served by the base station entities 112, 113, 114) and/or a fixed-line telecommunications network (or comprising a fixed-line part). The user equipment 20 is exemplarily shown as being in contact with the telecommunications network 100, i.e. exchanging data (i.e. typically in the form data packets) either from the user equipment 20 towards the telecommunications network 100 (in the context of the present invention also called uplink data 21, schematically shown, in FIG. 1, by means of an upwardly directed arrow) or vice versa, i.e. from the telecommunications network 100 towards the user equipment 20 (in the context of the present invention also called downlink data 22, schematically shown, in FIG. 1, by means of a downwardly directed arrow).

Regarding these data transmissions between the user equipment 20 and the telecommunications network 100, the present invention provides a method (as well as a corresponding user equipment 20 as well as a corresponding telecommunications network 100) for taking into account the energy intensity of these data exchanges or data transmissions in uplink and/or in downlink direction. The user equipment 20 is typically, at least temporarily, in communication exchange with the telecommunications network 100 using radio resources of an air interface between the user equipment 20 and the access network 110 (i.e. the respective base station entities 112, 113, 114 or WiFi access points 111). Regarding this communication exchange or in order to realize this data transmission or transmissions, typically a plurality of radio access technologies and/or a plurality of radio signal transmission schemes (or also a plurality of radio signal transmission schemes as part of one (or each) radio access technology) are available or are able to be used for transmitting such uplink data 21 or downlink data 22.

As a matter of fact, such a plurality of radio access technologies and/or radio signal transmission schemes (or combinations thereof) either involve a comparatively low or lower energy intensity (according to different measures to be discussed in greater detail), or otherwise involve a comparatively high or higher energy intensity—or, of course, are able to be ranked for their energy intensity. According to the present invention, these radio access technologies and/or radio signal transmission schemes are associated with or related to a first, lower level of energy intensity or at least a second, higher level of energy intensity (or, of course, are associated or related to a finer granularity, involving more than just two different levels of energy intensity), and the user equipment 20 comprises an energy priority information 150.

According to the present invention, in order to be able to take into account the energy intensity of such data transmissions between the user equipment 20 and the telecommunications network 100, the user equipment 20 receives, from the telecommunications network 100 or from a dedicated network node thereof (i.e. the telecommunications network 100 or the dedicated network node thereof transmits towards the user equipment 20), at least one energy intensity indication 250, the at least one energy intensity indication 250 being related to at least one radio access technology and/or at least one radio signal transmission scheme for transmitting uplink data and/or for receiving downlink data. Subsequently, at least one radio access technology and/or at least one radio signal transmission scheme is selected, by the user equipment 20, in dependency of the energy intensity indication 250 and the energy priority information 150 of the user equipment 20. In some embodiments, the energy priority information 150 is related to or reflects a preference of either a lower level of energy intensity or a higher level of energy intensity stored in the user equipment 20, and especially provided by the user of the user equipment 20.

In FIG. 2, the transmission of this energy intensity indication 250 (being related to the radio access technologies and/or radio signal transmission schemes) is schematically and exemplarily illustrated by means of diagrams of the different energy efficiencies of different radio access technologies and/or one of the radio signal transmission schemes that are possible to be used by the user equipment 20 connected to the telecommunications network 100. For example, base station entity 112 is able to use (or propose)— or, in the communication between the user equipment 20 and base station entity 112 (either in uplink direction and/or in downlink direction)—either a first (cellular) radio access technology or radio signal transmission scheme that involves a first (higher) energy intensity (designated by means of reference sign 330 in the middle part of FIG. 2), or a second (cellular) radio access technology or radio signal transmission scheme that involves a second (lower) energy intensity (designated by means of reference sign 331 in the middle part of FIG. 2). Furthermore, WiFi access point (or base station entity) 111 is likewise able to use (or propose)— or, in the communication between the user equipment 20 and WiFi access point 111 (either in uplink direction and/or in downlink direction)—either a third (non-cellular) radio access technology or radio signal transmission scheme that involves a third (higher) energy intensity (designated by means of reference sign 310 in the middle part of FIG. 2), or a fourth (non-cellular) radio access technology or radio signal transmission scheme that involves a fourth (lower) energy intensity (designated by means of reference sign 311 in the middle part of FIG. 2). In such a scenario, the energy intensity indication 250 would indicate, e.g., a lower energy intensity for the second and fourth radio access technology or radio signal transmission scheme, and a higher energy intensity for the first and third radio access technology or radio signal transmission scheme. On the right-hand side of FIG. 2, a schematical diagram regarding the involved required energy (in Joule), E(J), for different bandwidths of a certain first transmission (scheme) 380 (radio access technology or transmission scheme) or a certain second transmission (scheme) 390 (radio access technology or transmission scheme) are schematically shown; it can be seen that lower bandwidth transmissions for the first transmission (scheme) 380 are more energy intensive (per bandwidth) compared to higher bandwidth transmissions (per bandwidth), whereas for the second transmission (scheme) 390 lower bandwidth transmissions are less energy intensive (per bandwidth) compared to higher bandwidth transmissions (per bandwidth). Especially, according to the present invention, the energy intensity indication 250 (received by the user equipment 20 from its respective base station entity, say, base station entity 112) also comprises energy intensity indication 250 (or pieces of energy intensity indication 250) regarding one or a plurality of radio access technologies or radio signal transmission schemes that the user equipment 20 is (or would be) able to receive from another base station entity, especially from WiFi access point 111 (and vice versa).

Hence, the at least one energy intensity indication 250 comprises at least a first piece of energy intensity indication and a second piece of energy intensity indication, wherein the first piece of energy intensity indication is associated with or related to a first radio access technology and/or a first radio signal transmission scheme (e.g. of (or being able to be provided by) the base station entity the user equipment 20 is camping on), and wherein the second piece of energy intensity indication is associated with or related to a second radio access technology and/or a second radio signal transmission scheme (e.g. of (or being able to be provided by) either the same base station entity, or another base station entity (or WiFi access point) that the user equipment 20 is presently not connected to). Especially the at least two pieces of energy intensity indication refer to one single radio access technology, depending on different modes of operation and/or different radio signal transmission schemes used on the basis of that radio access technology.

Especially according to the present invention, the at least one energy intensity indication 250 refers to the energy intensity of data transmissions between the user equipment 20 and the telecommunications network 100 in terms of one or a plurality of the following measures of energy intensity:

the energy used per data volume transmitted, such as a value of Joules required per Mbyte transmitted, the energy used per bandwidth used, such as a value of Joules required per bandwidth, especially in Mbit per seconds, applied, the energy used per latency realized, such as a value of Joules required per archiving a latency expressed in milliseconds, wherein especially a first energy intensity indication 250 refers to a first of such measures of energy intensity and a second energy intensity indication 250 refers to a second of such measures of energy intensity, wherein at least one of the at least one energy intensity indication 250 and/or at least one of the pieces of energy intensity indication refers to or indicates one of at least three defined different levels of energy intensity, especially of at least four different levels of energy intensity, such as, e.g., (for three different levels:) low energy intensity, medium energy intensity, high energy intensity, or (for four different levels:) lowest energy intensity, lower energy intensity, higher energy intensity, and highest energy intensity.

According to the present invention, the energy priority information 150 especially defines, for at least one situation of both the user equipment 20 and, at least local, network conditions of the access network 110 and/or the telecommunications network 100 whether a rather lower level of energy intensity or a rather higher level of energy intensity is preferred by the user equipment 20 or its user, the energy priority information 150 especially being transmitted, by the user equipment 20, to the telecommunications network 100 or to a dedicated network node thereof.

According to an alternative of the present invention, each technology announces its particular energy consumption (or energy intensity) "ranking" for example in Joules/Mbps or Joules/Latency or Joules/Mbyte. This can be done also for multiple configurations in order to have possibilities to different consumption models (e.g. low energy consumption, but lower bitrate and larger delay vs. higher energy consumption, with higher bitrate and reduced delay vs. max. energy consumption with highest bitrate and lowest delay). One way of announcement according to the present invention is by using a common control chancel of the particular wireless technology (e.g. the BCCH in LTE/NR).

According to a further alternative of the present invention, as part of the registration procedure or as part of the service setup procedure, the telecommunications network 100 (either the radio access network 110 or the core network 120 taking care for multiple accesses, i.e. radio access technologies and/or radio signal transmission schemes) could configure the device (or user equipment 20) with an energy consumption (or energy intensity) "ranking" relative to different access types: for example in Joules/Mbps or Joules/Latency or Joules/Mbyte. This can be done also for multiple configurations in order to have possibilities to different consumption models (e.g. low energy consumption, but lower bitrate and larger delay vs. higher energy consumption, with higher bitrate and reduced delay vs. max. energy consumption with highest bitrate and lowest delay).

A specific focus according to the present invention is to implement the inventive procedures and methods by means of protocol extension for 4G/5G/6G cellular systems being defined by 3GPP; however, this does not exclude to apply the same or corresponding principles and related signaling also for non-3GPP accesses, such as, e.g., WiFi being defined by IEEE 802.11.

In the future, the focus might shift from ultra-high data rates with extremely low latencies to a more (environmentally) sustainable wireless communication, taking also into account the energy intensity of the different radio access technologies and/or radio schemes involved or (predominantly) used.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for taking into account energy intensity of data transmissions between a user equipment and a telecommunications network comprising an access network, the method comprising:

receiving, by the user equipment, from the telecommunications network, at least one energy intensity indication, wherein the at least one energy intensity indication is related to at least one radio access technology and/or at least one radio signal transmission scheme for transmitting uplink data and/or for receiving downlink data, wherein the user equipment comprises energy priority information, and wherein the energy priority information corresponds to a preference provided by a user of the user equipment for one level of energy intensity out of a plurality of levels of energy intensity stored in the user equipment; and selecting, by the user equipment, at least one radio access technology and/or at least one radio signal transmission scheme based on the at least one energy intensity indication and the energy priority information;

wherein the at least one energy intensity indication refers to energy intensity of data transmissions between the user equipment and the telecommunications network in terms of one or more of the following measures of energy intensity:

energy used per data volume transmitted;
energy used per bandwidth used; or
energy used per latency realized.

2. The method according to claim 1, wherein the at least one energy intensity indication is received, by the user equipment, via one or more of the following:
- a broadcast control channel;
- a dedicated control channel for the user equipment or a group of user equipments;
- as part of a registration procedure of the user equipment with the telecommunications network;
- as part of a service setup procedure of the user equipment with the telecommunications network; or
- as part of a pre-configuration using a secure subscriber element.

3. The method according to claim 1, wherein the user equipment is a mobile user equipment; and
- wherein the user equipment is configured to receive, from the telecommunications network:
  - mobile access as from a mobile communication network; and/or
  - fixed-line access as from a fixed-line telecommunications network, using wireless local area network (WLAN) functionality.

4. The method according to claim 1, wherein the at least one energy intensity indication comprises at least a first piece of energy intensity indication and a second piece of energy intensity indication, wherein the first piece of energy intensity indication is associated with or related to a first radio access technology and/or a first radio signal transmission scheme, and wherein the second piece of energy intensity indication is associated with or related to a second radio access technology and/or a second radio signal transmission scheme; and
- wherein at least two pieces of energy intensity indication refer to one single radio access technology, depending on different modes of operation and/or different radio signal transmission schemes used on the basis of that radio access technology.

5. The method according to claim 1, wherein the at least one energy indication comprises a first energy intensity indication referring to a first of measure of energy intensity and a second energy intensity indication referring to a second of measure of energy intensity; and
- wherein at least one energy indication of the at least one energy intensity indication and/or at least one piece of energy intensity indication comprised in the at least one energy intensity indication refers to or indicates a respective level of energy intensity out of a plurality of different levels of energy intensity.

6. The method according to claim 1, wherein the energy priority information defines, for at least one situation of the user equipment and at least local network conditions of the access network and/or the telecommunications network, whether a relatively lower level of energy intensity or a relatively higher level of energy intensity is preferred by the user equipment or the user; and
- wherein the energy priority information is transmitted, by the user equipment, to the telecommunications network.

7. The method according to claim 1, wherein the energy priority information corresponds to a user preference associated with the user equipment and/or to a subscription-related setting reflecting a pre-defined energy intensity setting that is able to be different at different points in time according to one or more of the following scenarios:
- the energy priority information is set to a relatively low energy intensity as part of a green mode subscription related to the user equipment; or
- the energy priority information is set to preferring a relatively low energy intensity for normal situations but is able to be set to a boost mode setting corresponding to preferring a relatively higher energy intensity at specific points in time and on specific demand from the user.

8. A user equipment for taking into account energy intensity of data transmissions between the user equipment and a telecommunications network comprising an access network, the user equipment comprising:
- a memory having processor-executable instructions stored thereon; and
- a processor configured to execute the processor-executable instructions to facilitate the following being performed by the user equipment;
- receiving, from the telecommunications network, at least one energy intensity indication, wherein the at least one energy intensity indication is related to at least one radio access technology and/or at least one radio signal transmission scheme for transmitting uplink data and/or for receiving downlink data, wherein the user equipment comprises energy priority information, and wherein the energy priority information corresponds to a preference provided by a user of the user equipment for one level of energy intensity out of a plurality of levels of energy intensity stored in the user equipment; and
- selecting at least one radio access technology and/or at least one radio signal transmission scheme based on the at least one energy intensity indication and the energy priority information;
- wherein the at least one energy intensity indication refers to energy intensity of data transmissions between the user equipment and the telecommunications network in terms of one or more of the following measures of energy intensity:
  - energy used per data volume transmitted;
  - energy used per bandwidth used; or
  - energy used per latency realized.

9. A non-transitory computer-readable medium having processor-executable instructions stored thereon for taking into account energy intensity of data transmissions between a user equipment and a telecommunications network comprising an access network, wherein the processor-executable instructions, when executed, facilitate the following being performed:
- receiving, by the user equipment, from the telecommunications network, at least one energy intensity indication, wherein the at least one energy intensity indication is related to at least one radio access technology and/or at least one radio signal transmission scheme for transmitting uplink data and/or for receiving downlink data, wherein the user equipment comprises energy priority information, and wherein the energy priority information corresponds to a preference provided by a user of the user equipment for one level of energy intensity out of a plurality of levels of energy intensity stored in the user equipment; and
- selecting, by the user equipment, at least one radio access technology and/or at least one radio signal transmission scheme based on the at least one energy intensity indication and the energy priority information;
- wherein the at least one energy intensity indication refers to energy intensity of data transmissions between the user equipment and the telecommunications network in terms of one or more of the following measures of energy intensity:

energy used per data volume transmitted;
energy used per bandwidth used; or
energy used per latency realized.

\* \* \* \* \*